(12) United States Patent
Matt et al.

(10) Patent No.: US 7,040,180 B2
(45) Date of Patent: May 9, 2006

(54) CORIOLIS MASS-FLOW MEASURING DEVICE

(75) Inventors: Christian Matt, Aesch (CH); Alfred Wenger, deceased, late of Neftenbach (CH); by Ida Verena Kobel Wenger, legal representative, Neftenbach (CH); Michael Fuchs, Eschbach (DE); Wolfgang Drahm, Erding (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/004,829

(22) Filed: Dec. 7, 2004

(65) Prior Publication Data
US 2006/0010990 A1    Jan. 19, 2006

Related U.S. Application Data

(60) Provisional application No. 60/546,183, filed on Feb. 23, 2004, provisional application No. 60/529,749, filed on Dec. 17, 2003.

(30) Foreign Application Priority Data

Dec. 12, 2003  (DE) ................................ 103 58 663
Feb. 17, 2004  (DE) ...................... 10 2004 007 889

(51) Int. Cl.
*G01F 1/84* (2006.01)

(52) U.S. Cl. ............................................... 73/861.357

(58) Field of Classification Search .................... None
See application file for complete search history.

(56) References Cited

U.S. PATENT DOCUMENTS

| | | | | | |
|---|---|---|---|---|---|
| 4,801,897 | A | * | 1/1989 | Flecken ................. | 73/861.357 |
| 5,069,074 | A | * | 12/1991 | Young et al. .......... | 73/861.356 |
| 5,648,616 | A | * | 7/1997 | Keel ..................... | 73/861.356 |
| 6,006,609 | A | * | 12/1999 | Drahm et al. .......... | 73/861.357 |
| 6,513,393 | B1 | | 2/2003 | Eckert | |

FOREIGN PATENT DOCUMENTS

| EP | 0 831 306 A1 | 3/1998 |
|---|---|---|
| WO | WO 00/36379 | 6/2000 |

* cited by examiner

*Primary Examiner*—Harshad Patel
(74) *Attorney, Agent, or Firm*—Bacon & Thomas (57) ABSTRACT

A Coriolis mass-flow/density meter includes at least one measuring tube, which is traversed in operation by medium. A support structure of the Coriolis mass-flow/density meter is fixed at an inlet end and at an outlet end of the measuring tube and thus clamps the measuring tube such that it can oscillate. In operation, the measuring tube is caused by means of an exciter arrangement to oscillate with mechanical oscillations, especially bending oscillations. Furthermore, the Coriolis mass-flow/density meter includes structure for producing measurement signals ($x_{s1}$, $x_{s2}$) representing inlet-end and outlet-end oscillations of the measuring tube. An evaluation electronics produces an intermediate value ($X'_m$) derived from the measurement signals ($x_{s1}$, $x_{s2}$) and representing an uncorrected mass flow rate. The evaluation electronics also produces a correction value ($X_K$) for the intermediate value ($X'_m$). The correction value ($X_K$) is derived from the measurement signals ($x_{s1}$, $x_{s2}$), especially from a second measured value ($X_\rho$) representing a density of the medium and especially likewise produced in the evaluation electronics. Moreover, the evaluation electronics produces a measured value ($X_m$) representing a mass flow rate on the basis of the intermediate value ($X'_m$) and the correction value ($X_K$).

8 Claims, 5 Drawing Sheets

CORIOLIS MASS-FLOW MEASURING DEVICE

FIELD OF THE INVENTION

The invention relates to a Coriolis mass-flow/density meter for a medium, especially a two, or more, phase medium, flowing in a pipeline, as well as to a method for producing a measured value representing a mass flow rate.

BACKGROUND OF THE INVENTION

In the technology of measurements and automation for processes, the measurement of physical parameters of a fluid flowing in a pipeline, parameters such as e.g. mass flow rate, density and/or viscosity, measuring devices are often used that effect reaction forces in the fluid, such as e.g. Coriolis forces corresponding to the mass flow rate, inertial forces corresponding to the density or frictional forces corresponding to the viscosity, etc., by means of a vibratory measurement pickup, placed in the course of the fluid-guiding pipeline and flowed-through, or traversed, by the fluid during operation, together with a measuring and operating circuit connected thereto. The measuring devices produce, derived from these forces, a measurement signal representing the particular mass flow rate, the particular viscosity and/or the particular density of the fluid. Vibratory measurement pickups are described e.g. in WO-A 03/076880, WO-A 02/37063, WO-A 01/33174, WO-A 00/57141, WO-A 99/39164, WO-A 98/07009, WO-A 95/16897, WO-A 88/03261, U.S. 2003/0208325, U.S. Pat. No. 6,513,393, U.S. Pat. No. 6,505,519, U.S. Pat. No. 6,006,609, U.S. Pat. No. 5,869,770, U.S. Pat. No. 5,796,011, U.S. Pat. No. 5,602,346, U.S. Pat. No. 5,301,557, U.S. Pat. No. 5,218,873, U.S. Pat. No. 5,069,074, U.S. Pat. No. 4,876,898, U.S. Pat. No. 4,733,569, U.S. Pat. No. 4,660,421, U.S. Pat. No. 4,524,610, U.S. Pat. No. 4,491,025, U.S. Pat. No. 4,187,721, EP-A 553 939, EP-A 1 001 254 or EP-A 1 281 938.

For guiding the fluid, the measurement pickups include at least one measuring tube held in an e.g. tubular or box-shaped support frame. The measuring tube has a curved or straight tube segment, which is caused to vibrate during operating, driven by an electromechanical exciter arrangement, in order to produce the above-mentioned reaction forces. For registering, especially inlet-end and outlet-end, vibrations of the tube segment, the measurement pickups additionally have an electrophysical sensor arrangement reacting to movements of the tube segment. In the case of Coriolis mass flow meters for a medium flowing in a pipeline, the measurement of mass flow rate rests, for example, on allowing the medium to flow through the measuring tube inserted into the pipeline and vibrating the measuring tube during operation, whereby the medium experiences Coriolis forces. These, in turn, effect that inlet-end and outlet-end regions of the measuring tube oscillate shifted in phase relative to one another. The size of these phase-shifts serves as a measure for the mass flow rate. The oscillations of the measuring tube are, therefore, registered by means of two oscillation sensors of the aforementioned sensor arrangement separated from one another along the length of the measuring tube and converted into oscillation measurement signals, from whose phase shift with respect to one another the mass flow rate is derived.

Already the above-referenced U.S. Pat. No. 4,187,721 mentions that usually the instantaneous density of the flowing medium is also measurable with Coriolis mass flow meters, and, indeed, on the basis of a frequency of at least one of the oscillation measurement signals delivered by the sensor arrangement. Moreover, usually also a temperature of the fluid to be measured is directly measured in suitable manner, for example by means of a temperature sensor arranged on the measuring tube. It can thus be assumed without more—even when not expressly stated—that, in any case, also density and temperature of the medium are measured by means of modern Coriolis mass flow measuring devices, especially since these are always needed in the case of mass flow rate measurement anyway for the compensation of measurement errors stemming from fluctuating fluid density; see, in this connection, especially the already mentioned WO-A 02/37063, WO-A 99/39164, U.S. Pat. No. 5,602,346 or also WO-A 00/36379.

In the use of measurement pickups of the described kind, it has, however, been found, that, in the case of inhomogeneous media, especially two or more phase fluids, the oscillation measurement signals derived from the oscillations of the measuring tube, and especially also the mentioned phase shift, are subject to considerable fluctuations, despite keeping the viscosity and density of the individual fluid phases practically constant and/or appropriately taking them into consideration, such that these signals and phase shift can, in some cases, become completely unusable without remedial measures. Such inhomogeneous media can be, for example, liquids, into which, as can be practically unavoidable in the case of dosing or bottling processes, a gas, especially air, present in the pipeline, is entrained or out of which a dissolved fluid, e.g. carbon dioxide, outgasses and leads to foam formation. Wet, or saturated, steam is another example of such inhomogeneous media which can be named.

Already in U.S. Pat. No. 4,524,610, a possible cause of this problem is indicated for the operation of vibratory measurement pickups, namely the circumstance that inhomogeneities entrained into the measuring tube by the fluid, inhomogeneities such as e.g. gas bubbles, deposit on its inner wall and so can influence the oscillatory behavior to a considerable degree. For avoiding this problem, it is additionally proposed to so install the measurement pickup that the straight measuring tube runs essentially vertically, in order to prevent the depositing of such disturbing, especially gaseous, inhomogeneities. This is, however, a very special solution, which is only realizable in very limited circumstances, especially in the technology of measurements in industrial processes. On the one hand, in this case the pipeline, into which the measurement pickup is to be installed, might have to be fitted to the pickup, instead of the reverse, which is something which a user can prove to be not too interested in hearing. On the other hand, it is possible, as already mentioned, that the measuring tubes can be curved, so that the problem can then not be solved anyway by an adapting of the orientation of installation. It has, moreover, become evident that the mentioned corruption of the measurement signal is not really significantly avoided anyway by the use of a vertically installed, straight measuring tube. Moreover, further attempts to avoid, in this way, the fluctuations of the thus-produced measurement signal in the case of flowing fluid have likewise proved unsuccessful.

Similar causes, as well as their effects on the measurement accuracy, in the case of determining mass flow rate have been discussed, for example, also in JP-A 10-281846, WO-A 03/076880 or U.S. Pat. No. 6,505,519. While, for decreasing the measurement errors associated with two, or more, phase fluids, WO-A 03/076880 proposes a flow-, respectively fluid-, conditioning preceding the actual flow measurement, both JP-A 10-281846 and U.S. Pat. No. 6,505,519 each prefer a correction of the flow measurement, especially the mass flow rate measurement, resting on the oscillation measurement signals. This correction utilizes, for example, pre-trained, possible even adaptive, classifiers for the oscillation measurement signals. The classifiers can, for example, be designed as Kohonen maps or neural networks, and conduct the correction either on the basis of some few parameters measured in operation, especially the mass flow rate and the density, as well as further features derived therefrom, or also with use of an interval of the oscillation measurement signals encompassing one or more oscillation periods.

The use of such classifiers includes, for example, the advantage that, in comparison to conventional Coriolis mass flow rate/density meters, little or no changes need to be made on the measurement pickup, be it regarding the mechanical structure, the exciter arrangement, or the operating circuit driving such, which are especially matched to the particular application.

However, a significant disadvantage of such classifiers is, among other things, that, as compared to conventional Coriolis mass flow meters, considerable changes are required in the area of producing the measured value, above all with regard to the analog-to-digital converter being used and with regard to the microprocessors. As, in fact, also described in the U.S. Pat. No. 6,505,519, such a signal evaluation requires, for example in the digitizing of the oscillation measurement signals, which can have an oscillation frequency of about 80 Hz, a sampling rate of about 55 kHz, or more, in order to achieve a sufficient accuracy. Expressed differently, the oscillation measurement signals have to be sampled using a sampling ratio of far above 600:1. Beyond this, the firmware stored and executed in the digital measurement circuit becomes correspondingly complex.

A further disadvantage of such classifiers is also to be seen in the fact that they have to be trained and correspondingly validated for the conditions of measurement actually existing during operation of the measurement pickup, be it the particular details of the installation, the fluid to be measured and its usually varying properties, or other factors influencing the measurement accuracy. Because of the high complexity of the interaction of all of these factors, the training and its validation can usually only occur on site and individually for every measurement pickup, a feature which, in turn, causes considerable complications to be associated with the startup of the measurement pickup. Furthermore, it has been found that such classifier algorithms, on the one hand because of the high complexity, on the other hand because of the fact that usually an appropriate, physical-mathematical model with technically relevant or comprehensible parameters is not explicitly present, classifiers exhibit a very low transparency and are thus often difficult to communicate. Associated with this, of course, considerable reservations can arise on the part of the customer, with such acceptance problems on the part of the customer especially arising, when the classifier being used is self-adapting, for example a neural network.

SUMMARY OF THE INVENTION

An object of the invention is to provide a corresponding Coriolis mass flow meter, which accurately measures mass flow rate, even in the case of inhomogeneous, especially plural-phase, fluids. A further object is to provide a corresponding method for producing the measurement results.

For achieving these objects, the invention resides in a Coriolis mass flow meter, especially Coriolis mass flow rate/density meters, for measuring a mass flow rate of a medium, especially a two, or more, phase medium, flowing in a pipeline, which Coriolis mass flow meter comprises:

At least one measuring tube inserted into the course of the pipeline and traversed by the medium during operation;

a support means, which is fixed to an inlet end and an outlet end of the measuring tube and thus holds the measuring tube such that it can oscillate;

an exciter arrangement, which causes the measuring tube to execute mechanical oscillations, especially bending oscillations, during operation;

oscillation sensors for producing
 a first oscillation measurement signal representing inlet-end oscillations of the measuring tube, as well as
 a second oscillation measurement signal representing outlet-end oscillations of the measuring tube; as well as an evaluation electronics,
 which produces a first intermediate value derived from the oscillation measurement signals and provisionally representing the mass flow rate to be measured, as well as producing a correction value derived from the first intermediate value for correcting the first intermediate value, and
 which determines, by means of the first intermediate value and the correction value, a mass flow rate measured value representing the mass flow rate to be measured,
 wherein the evaluation electronics produces the correction value on the basis of a second intermediate value derived from the first intermediate value and the second intermediate value represents a function value of a power function having the intermediate value as base and an, especially rational, exponent, which is smaller than zero.

Furthermore, the invention resides in a method for producing, by means of a Coriolis mass flow meter, especially a Coriolis mass flow rate/density meter, a first measured value representing a mass flow rate of a medium flowing in a pipeline, which method comprises the following steps:

Causing oscillations, especially bending oscillations, of a Coriolis mass flow meter measuring tube traversed by a flowing medium, for producing Coriolis forces;

registering the oscillations of the measuring tube and producing a first measurement signal representing inlet-end oscillations and a second measurement signal representing outlet-end oscillations for developing an intermediate value provisionally representing the mass flow rate and for developing a correction value for the intermediate value, wherein, for producing the correction value from the first intermediate value, a second intermediate value is derived, which represents a function value of a power function having the intermediate value as base and an, especially rational, exponent, which is smaller than zero; as well as correcting the intermediate value by means of the correction value.

BRIEF DESCRIPTION OF THE DRAWINGS

The invention and further advantageous embodiments will now be explained in greater detail on the basis of examples of embodiments, as presented in the figures of the drawing. Equal parts are provided with equal reference characters in all figures; when required for clarity, already mentioned reference characters are omitted in subsequent figures.

DESCRIPTION OF THE PREFERRED EMBODIMENTS

According to a first embodiment of the Coriolis mass flow meter of the invention, the evaluation electronics delivers a density measured value representing a density of the medium and derived from the first and/or from the second oscillation measurement signal, and the evaluation electronics determines the correction value also by means of the density measured value.

According to a second embodiment of the Coriolis mass flow meter of the invention, the evaluation electronics determines, by means of the density measured value, a deviation of the density of the medium from a predetermined reference density.

According to a third embodiment of the Coriolis mass flow meter of the invention, the evaluation electronics has a table memory, in which digitized correction values dependent on the second intermediate value are stored, and the table memory delivers the correction value by means of a digital memory access address formed on the basis of the second intermediate value.

According to a first embodiment of the method of the invention, the method comprises the following additional steps:

developing, on the basis of the measurement signals, a second measured value representing a density of the medium; and developing a correction value on the basis of the second measured value.

An advantage of the invention is that, in the case of the Coriolis mass flow meter of the invention as compared to a conventional Coriolis mass flow meter, only in the case of the usually digital evaluation electronics do changes, essentially limited to the firmware, have to be made, while both in the case of the measurement pickup as well as in the production and pre-processing of the oscillation measurement signals, little or no changes are required. Thus, for example, the oscillation measurement signals can still be sampled, as before, with a usual sampling ratio of well below 100:1, especially about 10:1.

Figure 1:
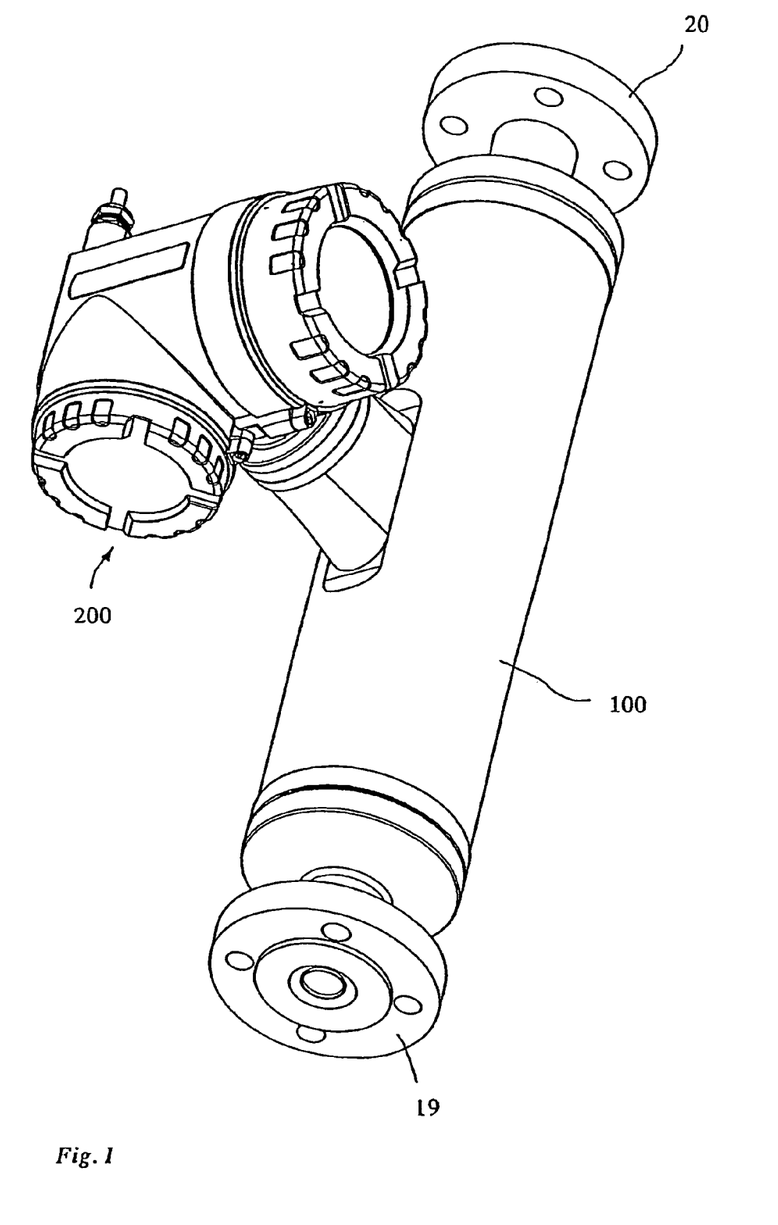
FIG. 1 shows perspectively in a side view a Coriolis mass flow measuring device serving for producing a mass flow rate measured value.

FIG. 1 shows perspectively a Coriolis mass flow measuring device 1, which serves to register a mass flow rate m of a medium flowing in a pipeline and to provide a mass flow rate measured value $X_m$ instantaneously representing this mass flow rate; the pipeline is not pictured, for reasons of clarity. The medium can be practically any flowable material, for example liquids, gases or vapors. The Coriolis mass flow rate measuring device 1 includes for these purposes a vibratory measurement pickup 10, as well as a measuring device electronics 50 of FIG. 2, electrically connected with the measurement pickup 10. For accommodating the measuring device electronics 50, an electronics housing 200 is provided, mounted on the outside of the measuring pickup 10.

For registering the mass flow rate m, Coriolis forces are produced in the fluid flowing through the measurement pickup 10 by the vibrating of the measurement pickup 10 during operation. The measurement pickup 10 is excited to vibrate by the measuring device electronics 50. The Coriolis forces are dependent on the mass flow rate m and react measurably (thus, they can be registered by sensor and are electronically evaluatable) on the measurement pickup 10. Besides the production of mass flow rate measured value $X_m$, the Coriolis mass flow rate measuring device serves also for measuring a density ρ of the flowing medium and for determining a density measured value $X_\rho$ instantaneously representing the density ρ.

Preferably, the measuring device electronics 50 is additionally so designed that it can during operation of the Coriolis mass flow rate measuring device 1 exchange measurement and/or other operational data with a measured value processing unit superordinated to the measuring device 1, for example a programmable logic controller (PLC), a personal computer and/or a workstation, via a data transmission system, for example a field bus system. Additionally, the measuring device electronics 50 is so designed that it can be fed from an external power supply, for example even over the aforementioned field bus system. For the case in which the vibratory measuring device is provided for a coupling to a field bus, the, especially programmable, measuring device electronics 50 has a suitable communications interface for data communications, e.g. for the sending of the measurement data to a superordinated programmable logic controller or to a superordinated process control system.

Figure 3:
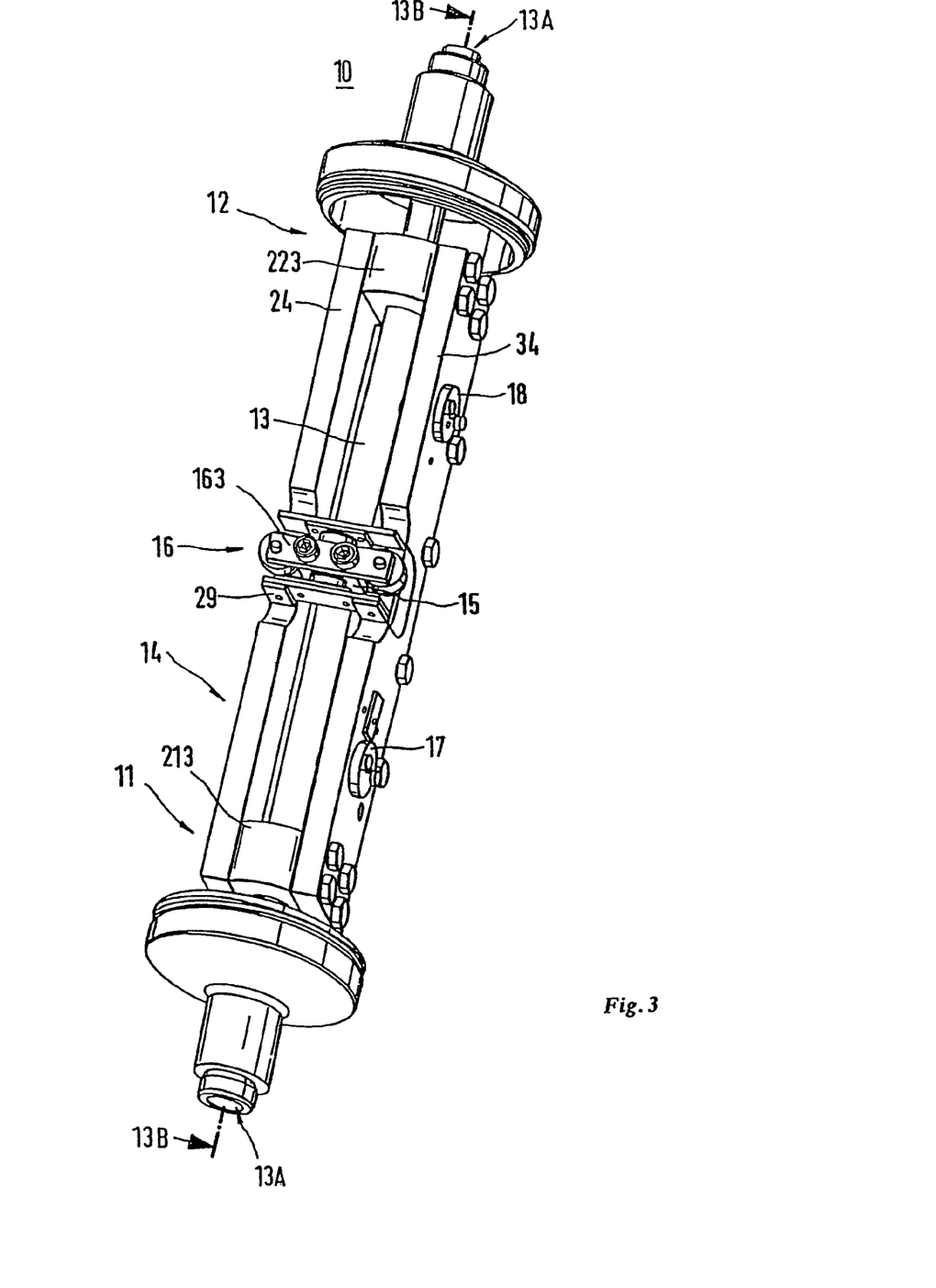
FIG. 3 shows perspectively in a first side view a partially sectioned example of an embodiment of a vibratory measurement pickup suited for the Coriolis mass flow measuring device of FIG. 1.
Figure 4:
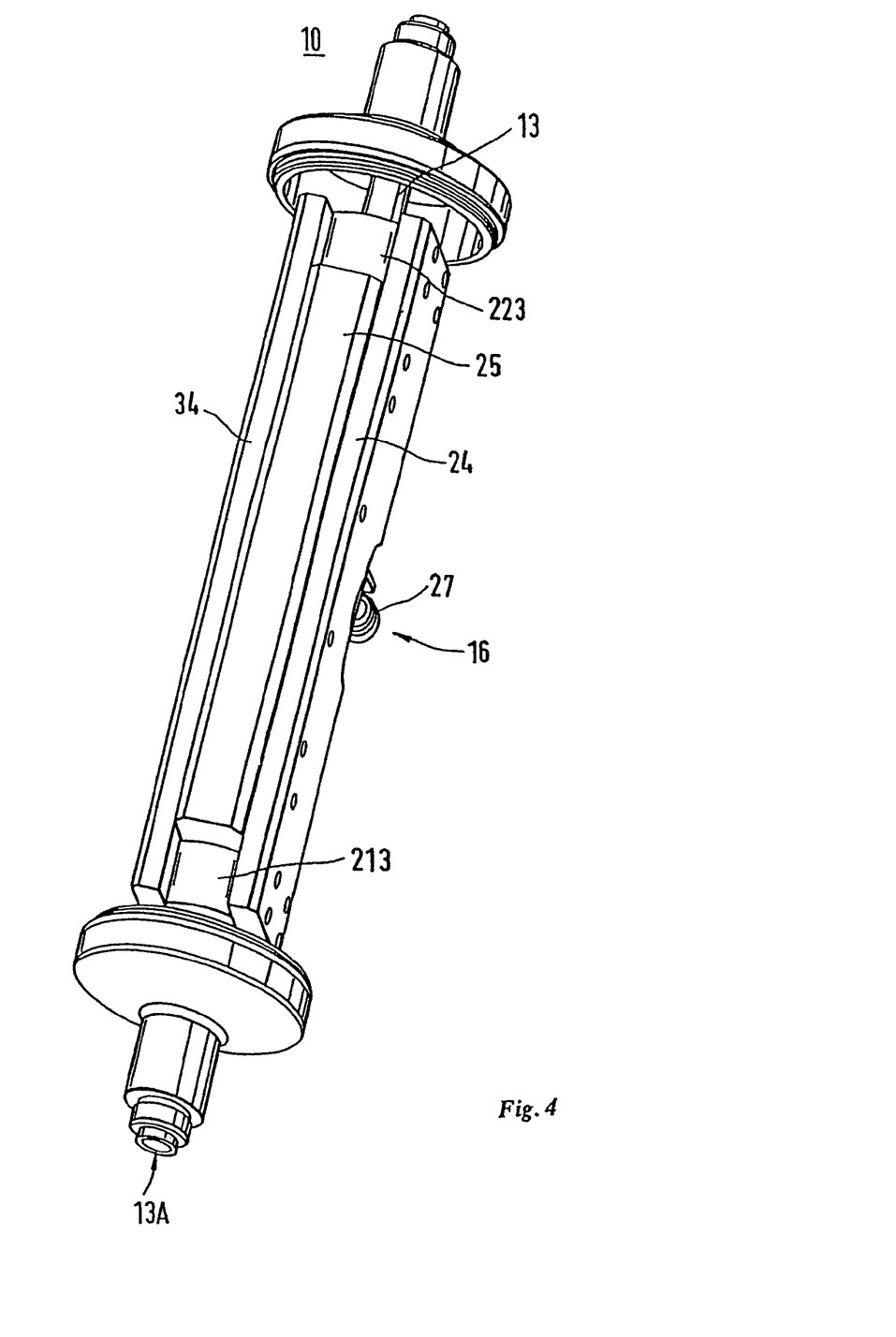
FIG. 4 shows the measurement pickup of FIG. 3 perspectively in a second side view.

FIGS. 3 and 4 show an example of an embodiment of a vibratory, physical-electrical, transducer arrangement serving as measurement pickup 10. The structure and functioning of such a transducer arrangement is known per se to those skilled in the art and described in detail e.g. also in U.S. Pat. No. 6,006,609.

For guiding the fluid to be measured, the measurement pickup includes at least one measuring tube 13 having an inlet end 11, an outlet end 12, and a predeterminable measuring tube lumen 13A, which is elastically deformable during operation and has a predeterminable nominal width. Elastic deformation of the measuring tube lumen 13A means here that, for producing fluid-internal and, consequently, fluid-characterizing, Coriolis forces, a spatial shape and/or a spatial position of the measuring tube lumen 13A is altered within an elastic range of the measuring tube 13 in predeterminable manner cyclically, especially periodically; compare e.g. U.S. Pat. No. 4,801,897, U.S. Pat. No. 5,648,616, U.S. Pat. No. 5,796,011 and/or U.S. Pat. No. 6,006,609. It is to be expressly noted here, furthermore, that, although the measurement pickup of the example of embodiment includes only a single, straight, measuring tube, such vibratory measurement pickup can be replaced for realizing the invention by practically any Coriolis mass flow rate measurement pickup described in the state of the art, especially such of the bending oscillation type with a curved or straight measuring tube vibrating exclusively or at least in part in a bending oscillation mode. Especially suited are, for example, vibratory measurement pickups with two parallel, curved measuring tubes flowed through by the medium to be measured, such as are described in detail in EP-A 1 154 243, U.S. Pat. No. 5,301,557, U.S. Pat. No. 5,796,011, U.S. Pat. No. 6,505,519 or WO-A 02/37063. Further suitable forms of embodiment for such transducer arrangements serving as measurement pickup 10 can be learned from e.g. WO-A 02/099363, WO-A 02/086426, WO-A 95/16 897, U.S. Pat. No. 5,602,345, U.S. Pat. No. 5,557,973 or U.S. Pat. No. 5,357,811. Especially suited as material for the utilized measuring tube 13 are e.g. titanium alloys. Instead of titanium alloys, however, other materials commonly used for such, especially also for curved, measuring tubes can be chosen, such as e.g. stainless steel, tantalum or zirconium, etc.

The measuring tube 13, which communicates in the usual way at its inlet end and outlet end with the pipeline introducing, respectively carrying away, the fluid, is clamped oscillatably in a rigid, especially bending- and twisting-resistant, support frame 14. Instead of the box-shaped support frame 14 shown here, of course other suitable support means, such as e.g. pipes extending parallel to, or coaxially with, the measuring tube, can be used.

The support frame 14 is fixed to the measuring tube 13 at its inlet end by means of an inlet plate 213 and at its outlet end by means of an outlet plate 223, with the plates being pierced by respective extensions of the measuring tube 13. Furthermore, the support frame 14 has a first side plate 24 and a second side plate 34, both of which are respectively attached to the inlet plate 213 and the outlet plate 223 such that they extend essentially parallel to the measuring tube and are arranged spaced from such, as well as from one another; compare FIG. 3. In this way, mutually facing side surfaces of the two side plates 24, 34 are likewise parallel to one another. A longitudinal bar 25 is fixed to the side plates 24, 34, spaced from the measuring tube 13, to serve as a countermass absorbing the oscillations of the measuring tube 13. The longitudinal bar extends, as is shown in FIG. 4, essentially parallel to the entire oscillatable length of the measuring tube 13; this is, however, not essential, because the longitudinal bar 25 can also be made shorter, should such be required. The support frame 14, including the two side plates 24, 34, the inlet plate 213, the outlet plate 223, and the longitudinal bar 25, has, consequently, a longitudinal center of mass running essentially parallel to an imaginary measuring tube central axis 13B connecting the inlet end 11 and the outlet end 12.

The heads of the screws shown in FIGS. 3 and 4 indicate that the mentioned fixing of the side plates 24, 34 to the inlet plate 213, to the outlet plate 223 and to the longitudinal bar 25 can be accomplished by screwed connections; however, other types of securement known to those skilled in the art can be used.

For the case where the measurement pickup 10 is to be assembled releasably with the pipeline, a first flange 19 is formed on the inlet end of the measuring tube 13 and a second flange 20 on the outlet end, as shown in FIG. 1; instead of the flanges 19, 20, however, other pipeline connecting pieces can be formed thereon for the releasable connecting with the pipeline, such as e.g. the so-called triclamp connections indicated in FIG. 3. Should it be necessary, the measuring tube 13 can, however, also be connected directly with the pipeline, e.g. by means of welding or brazing, etc.

For producing the mentioned Coriolis forces, the measuring tube 13 is driven during operation of the measurement pickup 10 by an electromechanical exciter arrangement 16 coupled to the measuring tube at a predeterminable oscillation frequency, especially a natural resonance frequency, in the so-called useful mode and, consequently, elastically deformed in predeterminable manner, with the natural resonance frequency also being dependent on a density of the fluid. In the illustrated example of embodiment, the vibrating measuring tube 13, as is usual in the case of such transducer arrangements of the bending-oscillation type, is deflected spatially from a static rest position, especially laterally deflected. The same holds true essentially also for those transducer arrangements having one, or more, curved measuring tubes executing cantilever oscillations about a corresponding longitudinal axis imaginarily connecting the respective inlet and outlet ends, or even for those transducer arrangements where one, or more, straight measuring tubes execute only bending oscillations in a single plane of oscillation.

The exciter arrangement 16 serves for producing an exciting force $F_{exc}$ acting on the measuring tube 13, by converting an electrical, exciting power $P_{exc}$ supplied from the measuring device electronics 50. The exciting power $P_{exc}$ serves essentially only to compensate for the power fraction removed from the oscillation system by mechanical and fluid-internal friction. For achieving a highest possible efficiency, the exciting power $P_{exc}$ is adjusted as accurately as possible, such that the oscillations of the measuring tube 13 are maintained essentially in the useful mode, e.g. at the fundamental resonance frequency.

Figure 5:
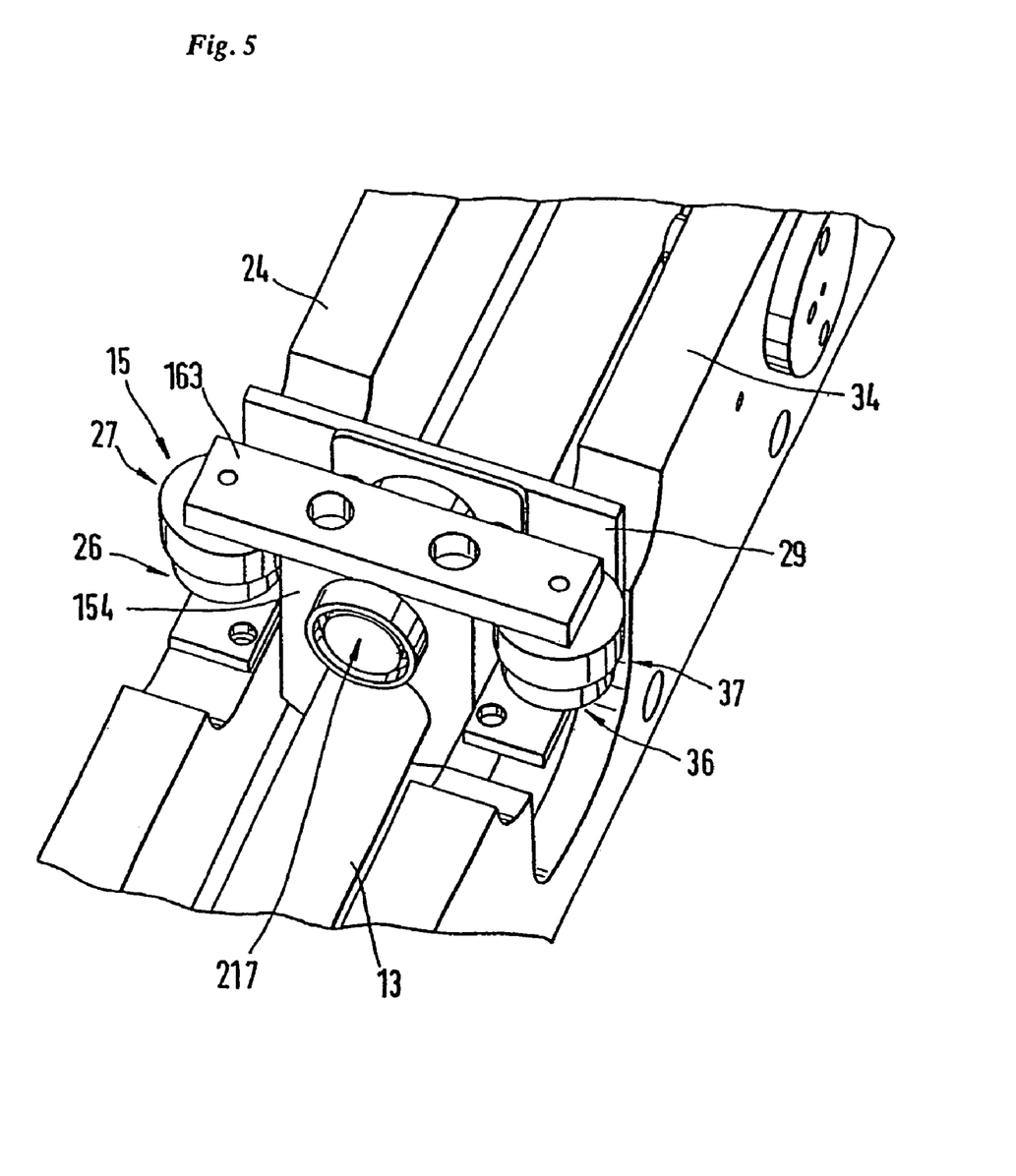
FIG. 5 shows an example of an embodiment of an electromechanical exciter arrangement for the measurement pickup of FIG. 3.

For the purpose of transmitting the exciting force $F_{exc}$ onto the measuring tube 13, the exciter arrangement 16 has, as shown in FIG. 5, a rigid, electromagnetically and/or electrodynamically driven lever arrangement 15 including a cantilever 154, fixed bending-resistantly on the measuring tube 13, and a yoke 163. The yoke 163 is likewise bending-resistantly fixed, in this case to an end of the cantilever 154 separated from the measuring tube 13, and, indeed, in such a manner that it is arranged above the measuring tube 13 and extends transversely thereto. The cantilever 154 can be e.g. a metal washer, which accommodates the measuring tube 13 in a bore. For further suitable embodiments of the lever arrangement 15, the already mentioned U.S. Pat. No. 6,006,609 is incorporated here by reference. The lever arrangement 15 is T-shaped and so arranged (compare FIG. 5) that it acts on the measuring tube 13 at a point essentially halfway between inlet and outlet ends 11, 12, whereby tube 13 experiences its greatest lateral deflection at this halfway point during operation.

For driving the lever arrangement 15, the exciter arrangement 16 includes, as shown in FIG. 5, a first exciter coil 26 and an associated first permanently magnetic armature 27, as well as a second exciter coil 36 and an associated second permanently magnetic armature 37. The two exciter coils 26, 36, preferably electrically connected in series, are so fixed on the support frame 14, preferably releasably, on both sides of the measuring tube 13 beneath the yoke 163, that they interact during operation with their respective armatures 27 and 37. The two exciter coils 26, 36 can, if required, of course also be connected in parallel with one another. As shown in FIGS. 3 and 5, the two armatures 27, 37 are separated from one another and fixed to the yoke 163 in such a manner that, during operation of the measurement pickup 10, the armature 27 is essentially permeated by a magnetic field of the exciter coil 26 and the armature 37 essentially by a magnetic field of the exciter coil 36. Thus, the armatures are moved on the basis of corresponding electrodynamic and/or electromagnetic forces. The movements of the armatures 27, 37 produced by means of the magnetic fields of the exciter coils 26, 36 are transmitted by the yoke 163 and by the cantilever 154 onto the measuring tube 13. These movements of the armatures 27, 37 are so formed, that the yoke 163 is deflected alternatingly from its rest position in the direction of the side plate 24, then in the direction of the side plate 34. A corresponding rotational axis of the lever arrangement parallel to the already mentioned measuring tube central axis 13B can run e.g. through the cantilever 154.

The support frame 14 includes, additionally, a holder 29 connected, especially releasably, with the side plates 24, 34, for the electromechanical exciter arrangement 16, especially for holding the exciter coils 26, 36 and, possibly, individual components of a magnetic brake arrangement 217 discussed below.

Finally, the measurement pickup 1 has a measuring pickup housing 100 surrounding measuring tube and support frame, in order to protect these from harmful external influences. The measuring pickup housing 100 is provided with a neck-like transition piece, on which the electronics housing 200 accommodating the measuring device electronics 50 is affixed; compare FIG. 1.

In the case of the measurement pickup 10 of the illustrated example of an embodiment, the lateral deflections of the vibrating measuring tube 13 clamped securely at the inlet end 11 and the outlet end 12 simultaneously result in an elastic deformation of its measuring tube lumen 13A. This deformation extends essentially over the entire length of the measuring tube 13. Furthermore, due to a torque acting on the measuring tube 13 from the lever arrangement 15, there arises at least sectionally in the measuring tube 13, simultaneously with the lateral deflections, a twisting about the central axis 13b of the measuring tube, so that the measuring tube 13 essentially oscillates in a mixed bending-oscillation, torsional mode serving as the useful mode. The twisting of the measuring tube 13 can, in this case, be so formed, that a lateral deflection of the end of the cantilever 154 spaced from the measuring tube 13 is either equally, or oppositely, directed with respect to the lateral deflection of the measuring tube 13. The measuring tube 13 can, thus, execute torsional oscillations in a first bending-oscillation, torsional mode corresponding to the equally directed case or in a second bending-oscillation, torsional mode corresponding to the oppositely directed case. Then, in the measurement pickup of the example of an embodiment, the natural fundamental resonance frequency of the second bending-oscillation, torsional mode of e.g. 900 Hz is about twice as high as that of the first bending-oscillation, torsional mode.

For the case, that the measuring tube 13 should execute oscillations during operation only in the second bending-oscillation, torsional mode, a magnetic braking arrangement 217 based on the eddy current principle is integrated into the exciter arrangement 16 to serve for stabilizing the position of the mentioned rotational axis. Thus, by means of the magnetic braking arrangement 217, it can be assured that the measuring tube 13 always oscillates in the second bending-oscillation, torsional mode and, consequently, possible external disturbing influences on the measuring tube 13 cannot lead to a spontaneous transfer into another, especially not into the first, bending-oscillation, torsional mode. Details of such a magnetic braking arrangement are described in detail in U.S. Pat. No. 6,006,609.

It is to be noted here that the imaginary measuring tube central axis 13B becomes slightly deformed when the measuring tube 13 undergoes its deflections in the second bending-oscillation, torsional mode, and, consequently, no plane is spanned during the oscillations but, instead, a slightly warped surface. Furthermore, the locus traced by the halfway point of the measuring tube central axis in this surface has the smallest curvature as compared to the locus of any other point on the central axis.

Figure 2:
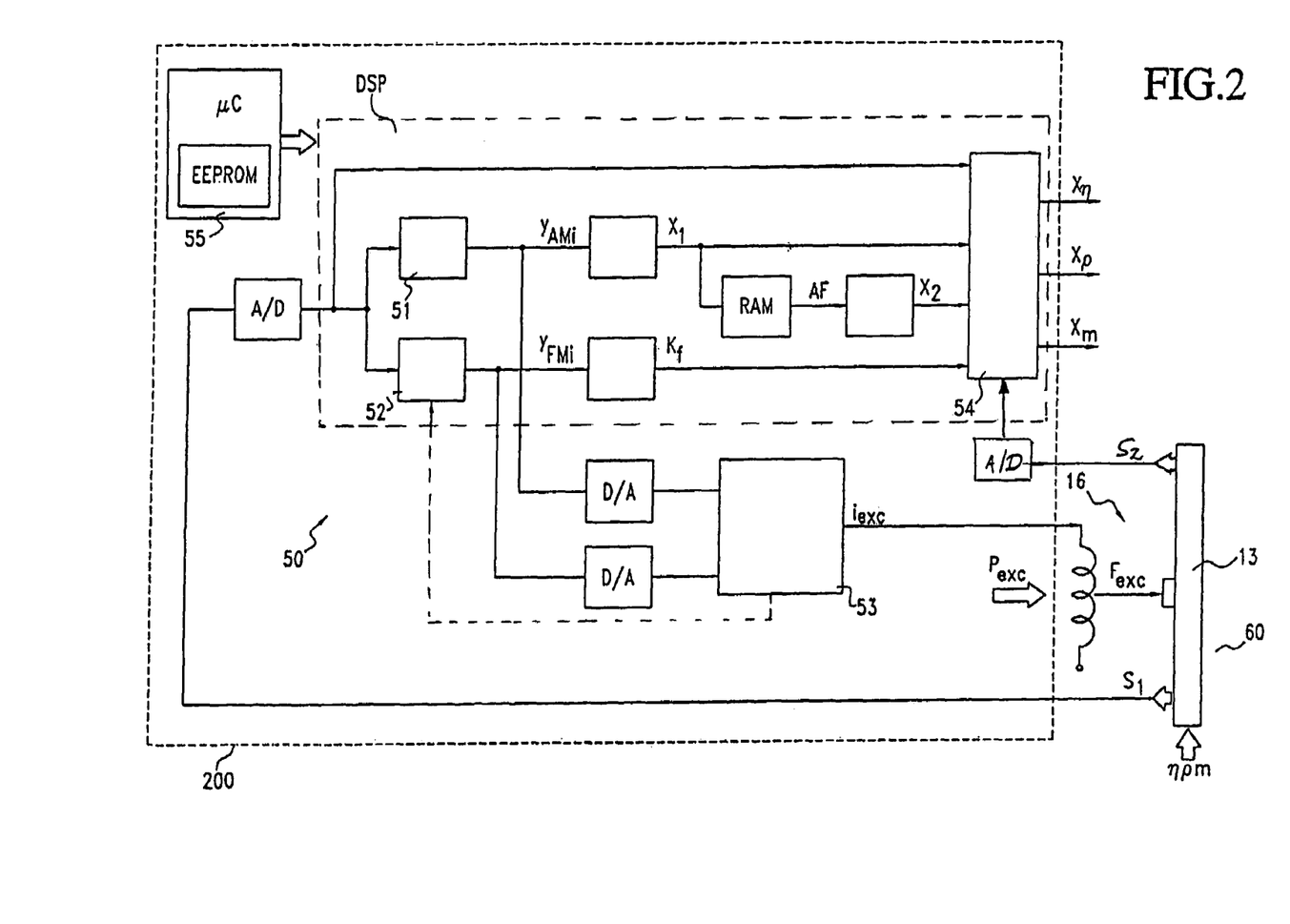
FIG. 2 shows schematically in the manner of a block diagram a preferred embodiment of a measuring device electronics suited for the Coriolis mass flow rate measuring device of FIG. 1.

For detecting the deformations of the measuring tube 13, the measurement pickup 10 includes, furthermore, a sensor arrangement 60, which produces a first, especially analog, oscillation measurement signal $s_1$ representing vibrations of the measurement tube 13 as sensed by means of a first sensor 17. The sensor 17 can e.g. be constructed on the basis of a permanently magnetic armature fixed on the measuring tube 13 and interacting with a sensor coil mounted on the support frame 14. For sensor 17, especially those are suited, which register a velocity of the deflections of the measuring tube 13, based on the electrodynamic principle. However, also acceleration-measuring, electrodynamic sensors can also be used, or even deflection-distance-measuring or optical sensors. Of course, other sensors known to those skilled in the art as suitable for the detection of such vibrations can also be used. The sensor arrangement 60 includes, additionally, a second sensor 18, especially one identical to the first sensor 17. The second sensor 18 delivers a second oscillation measurement signal $S_2$ likewise representing vibrations of the measurement tube 13. The two sensors 17, 18 are, in this embodiment, arranged in the measurement pickup 10 separated from one another along the measuring tube 13, especially at equal distances from the halfway point of the measuring tube 13. The sensors 17, 18 are thus arranged so that the sensor arrangement 60 registers vibrations locally both at the inlet end and at the outlet end of the measuring tube 13 and images these vibrations respectively as corresponding oscillation measurement signals $s_1$ and $s_2$. The first measurement signal $s_1$ and, if required, the second measurement signal $s_2$, which usually exhibit each one signal frequency component of an instantaneous oscillation frequency of the measuring tube 13, are fed to the measuring device electronics 50, as shown in FIG. 2.

To cause the measuring tube 13 to vibrate, the exciter arrangement 16 is fed by means of a likewise oscillating, exciting current $i_{exc}$ of adjustable amplitude and adjustable exciting frequency $f_{exc}$, in such a way that the exciter coils 26, 36 are traversed by the current during operation and, in corresponding manner, the magnetic fields required for moving the armatures 27, 37 are produced. The exciting current $i_{exc}$ can be e.g. sinusoidal or rectangular. The exciting frequency $f_{exc}$ of the exciting current $i_{exc}$ is preferably so selected and adjusted in the measurement pickup of the illustrated example of embodiment that the laterally oscillating measuring tube 13 oscillates, as much a possible, exclusively in the second bending-oscillation, torsional mode.

For producing and adjusting the exciting current $i_{exc}$, the measuring device electronics 50 includes a corresponding driver circuit 53, which is controlled by a frequency adjusting signal $y_{FM}$ representing the desired exciting frequency $f_{exc}$, and by an amplitude adjusting signal representing the desired amplitude, of the exciting current $i_{exc}$. The driver circuit can be realized e.g. by means of a voltage-controlled oscillator and a voltage-to-current converter connected downstream thereof; instead of an analog oscillator, however, also a numerically controlled, digital oscillator can be used for setting the exciting current $i_{exc}$.

For producing the amplitude adjustment signal $y_{AM}$, an amplitude control circuit 51 integrated into the measuring device electronics 50 can be used. The amplitude control circuit 51 actualizes the amplitude adjusting signal YAM on the basis of the instantaneous amplitude of at least one of the two sensor signals $s_1$, $s_2$, as well as on the basis of a corresponding, constant or variable, amplitude reference value $W_1$; where required, an instantaneous amplitude of the exciting current $i_{exc}$ can also be referenced for generating the amplitude adjustment signal $y_{AM}$. Such amplitude control circuits are likewise known to those skilled in the art. In terms of an example for such an amplitude control circuit, reference is made to the Coriolis mass-flow meters of the series "PROMASS I" of the assignee. The amplitude control circuit in such case is preferably so embodied that the lateral oscillations of the measuring tube 13 are controlled to a constant (thus also independent of the density ρ) amplitude.

As concerns the frequency control signal $y_{FM}$, it can be delivered from a corresponding frequency control circuit 52, which actualizes such e.g. on the basis of at least the sensor signal $s_1$, as well as on the basis of a frequency-representing, DC voltage serving as a corresponding frequency reference value $W_2$.

Preferably, the frequency control circuit 52 and the driver circuit 53 are connected together into a phase-locked loop, which is used in manner known to those skilled in the art to adjust the frequency adjusting signal $y_{FM}$ continuously to an instantaneous resonance frequency of the measuring tube 13 on the basis of a phase difference, measured between at least one of the sensor signals $s_1$, $s_2$ and the desired, respectively the measured, exciting current $i_{exc}$. The construction and use of such phase-locked loops for maintaining measuring tubes at their mechanical resonance frequencies is described in detail e.g. in U.S. Pat. No. 4,801,897. Of course, other frequency control circuits known to those skilled in the art can be used, such as e.g. described in U.S. Pat. No. 4,524,610 or U.S. Pat. No. 4,801,897. Furthermore, respecting a use of such frequency control circuits for measurement pickups of the described kind, reference is made to the already mentioned series "PROMASS I". Other circuits suitable as driver circuits can be taken from, for example, U.S. Pat. No. 5,869,770 or U.S. Pat. No. 6,505,519.

In a further embodiment of the invention, the amplitude control circuit 51 and the frequency control circuit 52 are realized by means of a digital signal processor DSP provided in the measuring device electronics 50 and by means of program codes correspondingly implemented in such and running therein. The program codes can be stored persistently, or even permanently, in a non-volatile memory EEPROM of a microcomputer 55 controlling and/or monitoring the signal processor and can be loaded upon startup of the signal processor DSP into a volatile data memory RAM of the measuring device electronics 50 integrated e.g. in the signal processor DSP. Suitable for such applications are signal processors e.g. of type TMS320VC33 available from the firm Texas Instruments Inc.

It is practically self-evident that at least the sensor signal $s_1$, and, if required, also the sensor signal $S_2$, can be converted by means of appropriate analog-to-digital converters A/D into corresponding digital signals for processing in the signal processor DSP; compare, in this connection, especially EP-A 866,319. If required, adjusting signals issued from the signal processor, such as e.g. the amplitude adjustment signal $y_{AM}$ or the frequency adjustment signal $y_{FM}$, can be converted digital-to-analog in corresponding manner.

As shown in FIG. 2, the oscillation measurement signals $x_{s1}$, $x_{s2}$ are additionally fed to a measuring circuit 21 of the measuring device electronics. Measuring circuit 21 serves in manner known per se to those skilled in the art for determining a measured value corresponding to the mass flow rate to be measured, on the basis of phase difference detected between the two, perhaps first suitably conditioned, oscillation measurement signals $x_{s1}$, $x_{s2}$. Measuring circuit 21 can be one of a number of measuring circuits, especially digital circuits, conventionally used for such purpose, which determine the mass flow rate on the basis of the oscillation measurement signals $x_{s1}$, $x_{s2}$; compare, in this connection, especially the above-mentioned WO-A 02/37063, WO-A 99/39164, U.S. Pat. No. 5,648,616, U.S. Pat. No. 5,069,074. Of course, other measuring circuits known to those skilled in the art to be suitable for Coriolis mass-flow measuring devices can be used. Such measuring circuits measure and suitably evaluate the phase, and/or the time, differences between the oscillation measurement signals $x_{s1}$, $x_{s2}$. Advantageously, the measuring circuit 21 can be realized likewise by means of the signal processor DSP.

As already mentioned above, inhomogeneities in the flowing medium, for example gas bubbles entrained in liquids, or layers of foam, can lead to the result that a measured value determined conventionally on the basis of an assumed homogeneous medium do not agree sufficiently accurately with the actual mass flow rate, i.e. the value needs to be appropriately corrected; this preliminarily determined measured value provisionally representing the mass flow rate is, therefore, designated as a first intermediate value $X'_m$, from which, in turn, the mass flow rate measured value $X_m$, which does represent the mass flow rate sufficiently accurately, is derived by means of the evaluation electronics 21.

Already discussed in the state of the art in this connection is that such inhomogeneities, depending on the principle of measurement, show up as a change in the density measured for the flowing medium. Further investigations on the part of the inventors have led in this connection, however, to the surprising discovery that the correction of the intermediate value $X'_m$, contrary to explanations in the state of the art, can, on the one hand, be carried out by using few, very simply determined correction factors, which can themselves be derived, without more, from the directly measured parameters, especially the measured density and the provisionally measured, mass flow rate. On the other hand, the correction can be performed using the initially determined, density measured value $X_\rho$, and the initially determined intermediate value $X'_m$ with a computational effort quite small in comparison to the earlier mentioned, more complex calculational methods.

For the accurate measurement of the mass flow rate, the evaluation electronics 2 derives a corresponding correction value $X_K$ from the intermediate value $X'_m$ and calculates, especially digitally, the mass flow rate measured value $X_m$ using the correction value $X_K$ applied to the intermediate value $X'_m$. For example, the correction can be done in simple manner based on the formula $$X_m = (1+X_K) \cdot X'_m \qquad (1)$$

According to the invention, the evaluation electronics derives for this purpose a second intermediate value $X_2$ from the intermediate value $X'_m$. The second intermediate value $X_2$ represents a functional value of a power function, $X'^n_m$, with the intermediate value $X'_m$ as base and an, especially rational, exponent n, where n is less than zero. That is, the second intermediate value should obey the functional relationship:

$$X_2 = K_K \cdot X'^n_m \text{ with } n < 0 \qquad (1)$$

where $K_K$ is a coefficient serving for matching, or scaling, of the intermediate value $X_2$ and can be determined in advance, for example individually at the calibration of the Coriolis mass flow measuring device 1, or even device-type specifically, and stored digitally e.g. in the non-volatile memory EEPROM. According to one embodiment of the invention, the exponent n therein is chosen to be greater than −1, e.g. −0.5 or −0.25.

In a further development of the invention, a deviation $\Delta\rho$ of the density measured value $X_\rho$ of the medium from a predetermined reference density is determined by means of the evaluation electronics on the basis of the density measured value $X_\rho$ and on the basis of an initially determined or contemporaneously measured reference density value $K_\rho$, which can be stored, for example, as a constant value during startup of the Coriolis mass flow meter or transmitted during operation from the outside to the Coriolis mass flow meter. For producing the correction value $X_K$, the thus-determined deviation $\Delta\rho$ is processed with the second intermediate value $X_2$ according to the formula $$X_K = \Delta\rho \cdot X_2 \qquad (2)$$

The reference density value $K_\rho$ can, based on knowledge of the fluid to be measured, be manually entered, for example on site or from a remote control room, or it can be transmitted to the measuring device electronics, for example via field bus, from an external density meter.

In an embodiment of the invention, the reference density value $K_\rho$ is determined using a density measured value $X_{\rho,0}$ likewise stored in the measuring device electronics, with the stored density measured value $X_{\rho,0}$ representing a density of the medium measured in a homogeneous medium or in a medium assumed to be homogeneous. In a further development of this embodiment of the invention, the density measured-value $X_{\rho,0}$, stored as the reference density value $K_\rho$, is used for subsequent correction of an intermediate value $X'_m$ previously determined in an inhomogeneous medium. This embodiment of the invention can be used in especially advantageous manner e.g. in the case of a dosing or bottling process, where, on the one hand, significantly varying flow conditions exist within a charge in the measuring tube over a short time sequence, especially even in the case of a measuring tube which is not completely filled, and where, on the other hand, especially the mass flow rate totalized over an entire charge is of interest, and even more especially the total mass of the bottled medium.

Based on the use of Equation (2), Equation (3), the correction value $(X_K)$, can be determined in simple manner based on the formula $$X_K = K_K \cdot \frac{\Delta\rho}{\sqrt{X_m}} \qquad (3)$$

The aforementioned functions, symbolized by the Equations (1) to (4), serving for production of the mass flow rate measured value $X_m$, can be implemented at least partially in an evaluation stage 54 of the measuring device electronics 50. The evaluation stage 54 can advantageously be realized e.g. likewise by means of the signal processor DSP or e.g. also by means of the above-mentioned microcomputer 55.

The building and implementing of corresponding algorithms, which follow the prescribed equations or represent the functioning of the amplitude control circuit 51, respectively the frequency control circuit 52, as well as their translation into program codes executable in such signal processors, is, per se, within the ability of those skilled in the art and does not, therefore, require detailed explanation. Of course, the aforementioned equations can also, without more, be represented completely or partially by means of corresponding discretely assembled, analog and/or digital, computational circuits in the measuring electronics 50.

In another embodiment of the invention, the evaluation electronics 2 has, furthermore, a table memory, in which a set of digital correction values $X_{K,i}$ is stored in advance, for example at the time of the calibration of the Coriolis mass flow measuring device. These correction values $X_{K,i}$ are accessed via a memory address derived from the second intermediate value $X_2$ valid at the instant. The correction value $X_K$ can e.g. be determined in simple manner thereby, that the instantaneously determined intermediate value $X_2$ is compared with corresponding values previously input in the table memory for the intermediate value $X_2$ and on the basis of such comparison that correction value $X_{K,i}$ is read out, which corresponds to the input value coming closest to the intermediate value $X_2$. The table memory can be a programmable read-only memory, thus an EPROM or an EEPROM. The use of such a table memory has, among other things, the advantage that the correction value $X_K$ is very rapidly available, once the intermediate value $X_2$ is calculated at runtime. Additionally, the correction values $X_{K,i}$ entered in the table memory can be determined on the basis of few calibration measurements, in advance and very exactly, e.g. based on Equation (2) and using the method of least squares.

The invention claimed is:

1. A Coriolis mass flow meter, especially a Coriolis mass flow/density meter, for measuring a mass flow rate of a medium, especially a two, or more, phase medium, flowing in a pipeline, which Coriolis mass flow meter comprises:

at least one measuring tube inserted into the course of the pipeline and traversed by the medium during operation, said at least one measuring tube having an inlet end and an outlet end;

support means, which is fixed at said inlet end and said outlet end of said measuring tube and thus holds said measuring tube such that it can oscillate;

an exciter arrangement, which causes said measuring tube to execute mechanical oscillations, especially bending oscillations, during operation;

oscillation sensors for producing a first oscillation measurement signal $(x_{s1})$ representing inlet-end oscillations of said measuring tube, as well as a second oscillation measurement signal $(x_{s2})$ representing outlet-end oscillations of said measuring tube; and evaluation electronics, which produces a first intermediate value $(X'_m)$ derived from said first and said second oscillation measurement signals $(x_{s1}, x_{s2})$ and provisionally representing the mass flow rate to be measured, as well as producing a correction value $(X_K)$ derived from said first intermediate value $(X'_m)$ for correcting said first intermediate value $(X'_m)$, and which determines, by means of said first intermediate value $(X'_m)$ and said correction value $(X_K)$, a mass flow rate, measured value $(X_m)$ representing a mass flow rate to be measured, wherein:

said evaluation electronics produces said correction value $(X_K)$ on the basis of a second intermediate value $(X_2)$ derived from said first intermediate value $(X'_m)$ said second intermediate value represents a function value of a power function, $X'^n_m$, with said intermediate value $(X'_m)$ as base and an, especially rational, exponent (n), which is smaller than zero.

2. The Coriolis mass flow meter as claimed in claim 1, wherein:
    said evaluation electronics delivers a density measured value ($X_{92}$) representing a density of the medium and derived from said first and/or said second oscillation measurement signal ($x_{s1}$, $x_{s2}$); and
    said evaluation electronics determines said correction value ($X_K$) also by means of said density measured value ($X_\rho$).

3. The Coriolis mass flow meter as claimed in claim 2, wherein:
    said valuation electronics determines by means of said density measured value ($X_\rho$) a deviation ($\Delta_\rho$) of the density of the medium from a predetermined reference density and said correction value ($X_K$) based on the formula $$X_K = \Delta\rho \cdot X_2.$$

4. The Coriolis mass flow meter as claimed in claim 1, wherein:
    said evaluation electronics determines said correction value ($X_K$) based on a polynomial $$X_K = \frac{\Delta\rho}{\sqrt{X_m}}.$$

5. The Coriolis mass flow meter as claimed in claim 1, wherein:
    said evaluation electronics determines said mass flow rate, measured value ($X_m$) based on the formula $$X_m = (1 + X_K) \cdot X^*_m.$$

6. The Coriolis mass flow meter as claimed in claim 1, wherein:
    said evaluation electronics has a table memory, in which digitized correction values are stored as a function of said second intermediate value ($X_2$), said table memory delivers said correction value ($X_K$) by means of a digital memory access address formed on the basis of said second intermediate value ($X_2$).

7. A method for producing, by means of a Coriolis mass flow meter, especially a Coriolis mass flow rate/density meter, a first measured value ($X_m$) representing a mass flow rate of a medium flowing in a pipeline, which method comprises the steps of:
    causing oscillations, especially bending oscillations, of a Coriolis mass flow meter measuring tube traversed by a flowing medium, for producing Coriolis forces;
    registering the oscillations of the measuring tube and producing a first measurement signal ($x_{s1}$) representing inlet-end oscillations and a second measurement signal ($x_{s2}$) representing outlet-end oscillations for developing an intermediate value ($X'_m$) provisionally representing the mass flow rate and for developing a correction value ($X_K$) for the intermediate value ($X'_m$);
    deriving a second intermediate value ($X_2$) for producing the correction value ($X_K$), from the first intermediate value ($X'_m$), which represents a function value of a power function, $X'^n_m$, having the intermediate value ($X'_m$) as base and an, especially rational, exponent (n), which is smaller than zero; and
    correcting the intermediate value ($X'_m$) by means of the correction value ($X_K$).

8. The method as claimed in claim 7, further comprising the steps of:
    developing, based on the measurement signals ($x_{s1}$, $x_{s2}$), a second measured value ($X_\rho$) representing a density of the medium; and
    developing a correction value ($X_K$) on the basis of the second measured value ($X_\rho$).

* * * * *